C. W. ARMBRUST.
BRAKE SHOE.
APPLICATION FILED FEB. 19, 1916.
1,239,444.
Patented Sept. 11, 1917.
3 SHEETS—SHEET 1.
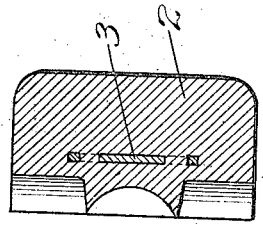
Fig. 3.
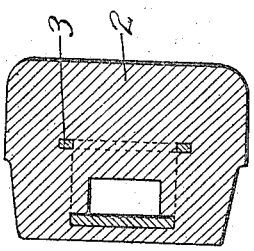
Fig. 4.
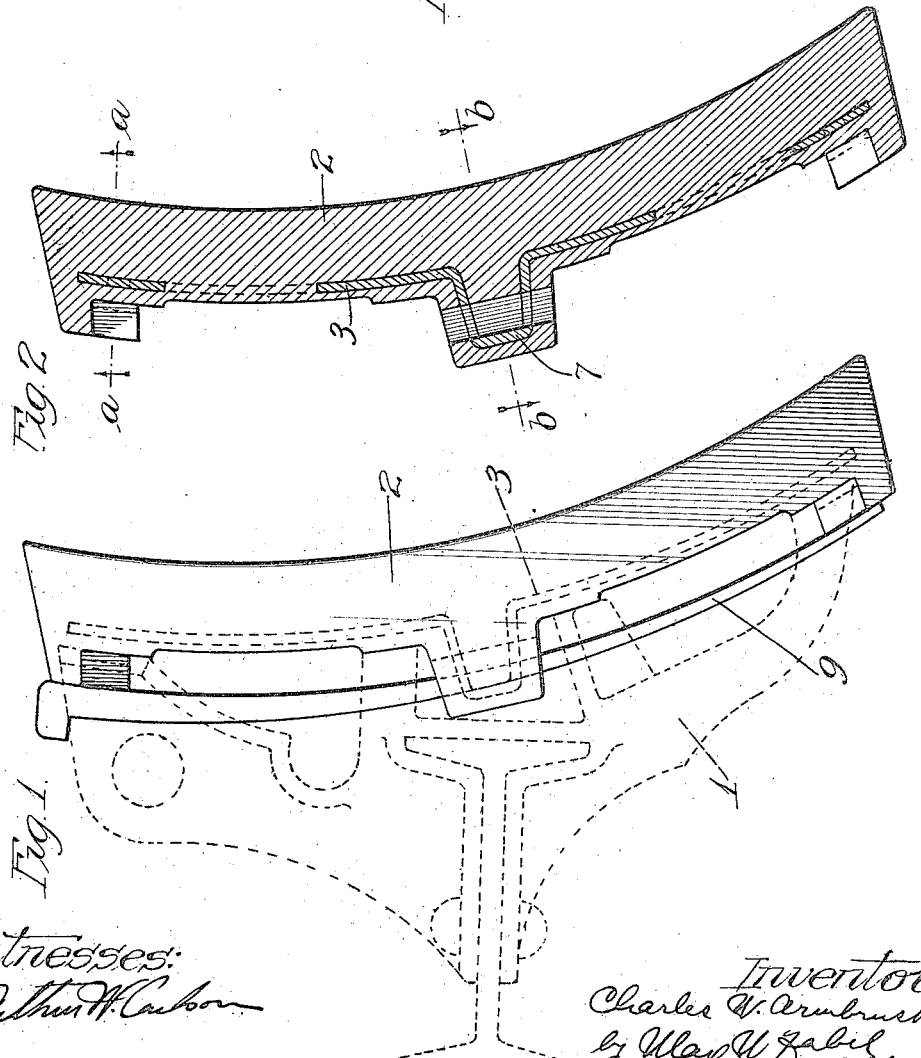
Fig. 2.
Fig. 1.
Witnesses:
Arthur W. Carlson
Inventor.
Charles W. Armbrust
by May W. Gabel
Atty.

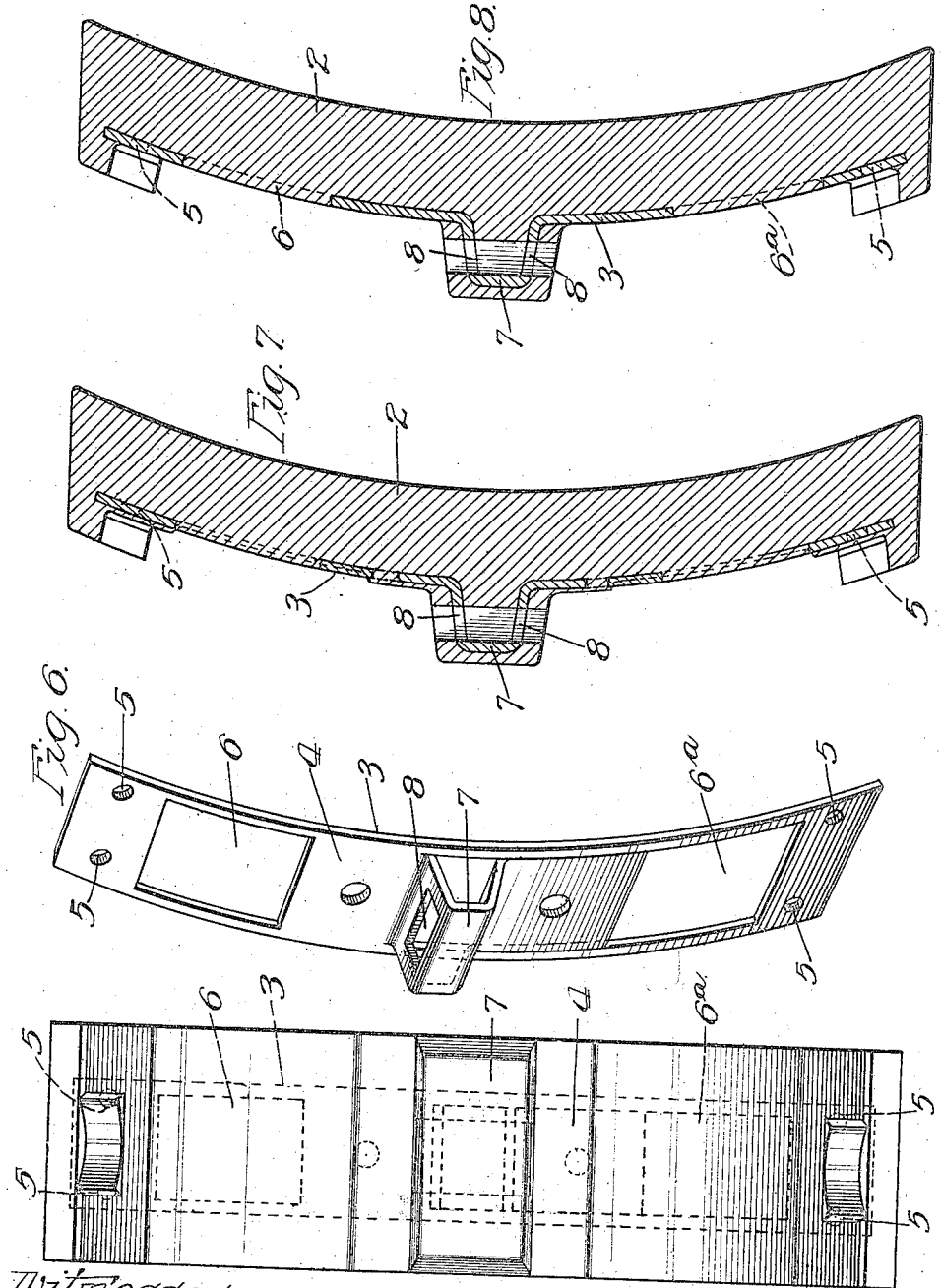

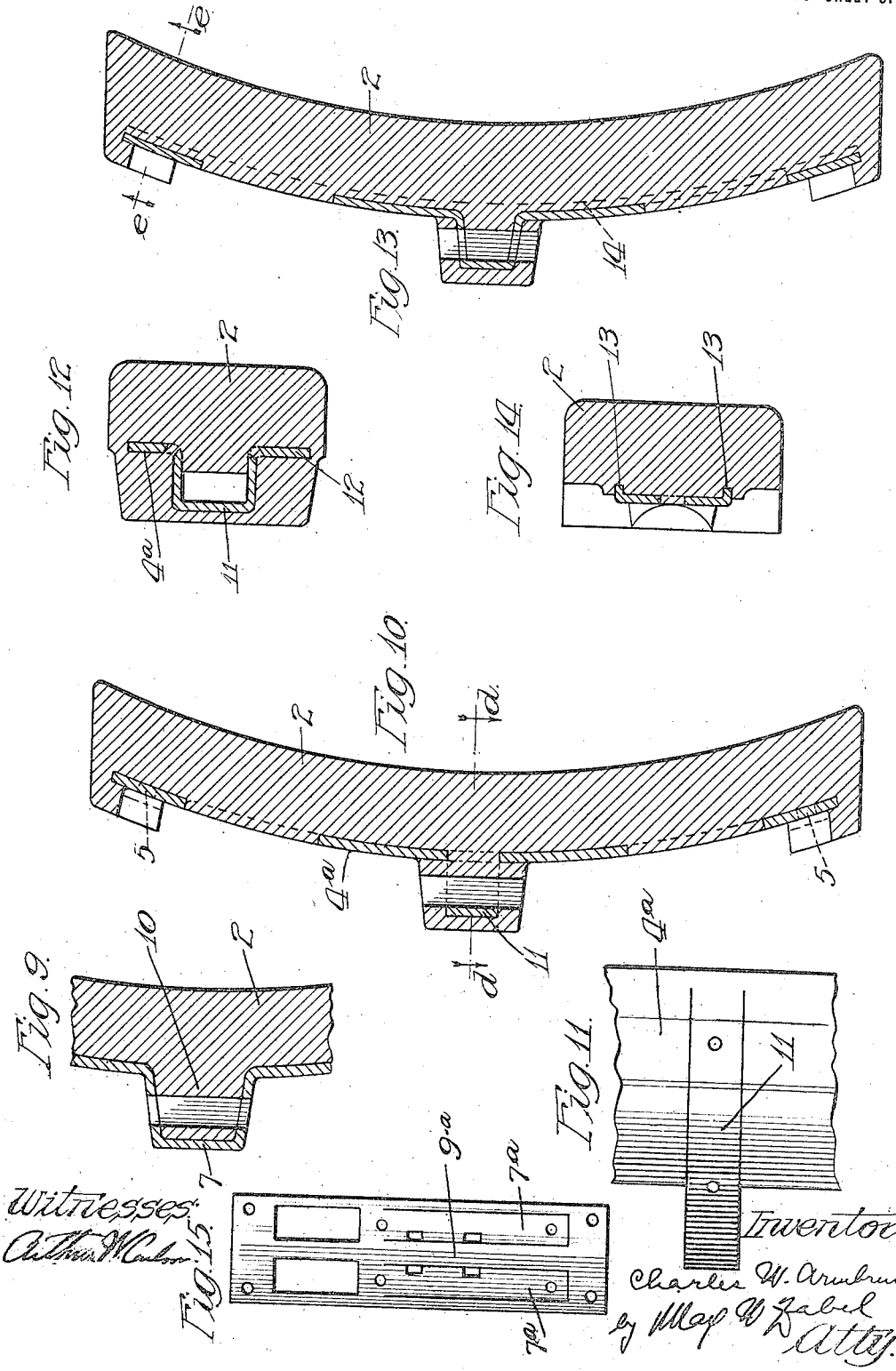

UNITED STATES PATENT OFFICE.

CHARLES W. ARMBRUST, OF CHICAGO, ILLINOIS, ASSIGNOR, BY MESNE ASSIGNMENTS, TO THE AMERICAN BRAKE SHOE & FOUNDRY COMPANY, OF WILMINGTON, DELAWARE, A CORPORATION OF DELAWARE.

BRAKE-SHOE.

1,239,444.   Specification of Letters Patent.   Patented Sept. 11, 1917.

Application filed February 19, 1916.   Serial No. 79,236.

*To all whom it may concern:*

Be it known that I, CHARLES W. ARMBRUST, a citizen of the United States, residing at Chicago, in the county of Cook and State of Illinois, have invented a certain new and useful Improvement in Brake-Shoes, of which the following is a full, clear, concise, and exact description, reference being had to the accompanying drawings, forming a part of this specification.

My invention relates to brake shoes and has for its object the provision of an improved brake shoe structure, having reference particularly to the so called back plate to which the brake shoe proper is secured.

My invention contemplates in general the provision of a back plate structure of such a character that the body portion of the back plate is not distorted during the forming of the key lug, which is formed out of the material of the body portion, the body portion being merely rounded into its arcuate form.

I show in this application several forms in which my invention may be carried out. In the preferred form disclosed herein the metal to form the key lug is drawn longitudinally from the metal of the body portion. As a further improvement of my improved back plate I provide flanges preferably along both sides thereof, which flanges serve to strengthen the union between the back plate and the brake shoe, and also strengthen the back.

I will describe various forms which my invention may take more in detail by referring to the accompanying drawings, in which—

Figure 1 is a side view of a brake shoe constructed in accordance with my invention, its association with the brake head being indicated by dotted lines;

Fig. 2 is a longitudinal sectional view of the brake shoe illustrated in Fig. 1;

Fig. 3 is a sectional view on line *a—a* of Fig. 2;

Fig. 4 is a sectional view on line *b—b* of Fig. 2;

Fig. 5 is a top view of the brake shoe shown in Fig. 1;

Fig. 6 is a perspective view of the formed back;

Figs. 7 and 8 respectively are views of the back illustrated in Fig. 6, illustrating various styles of associating it with the brake shoe;

Fig. 9 is a fragmentary view to further illustrate a modified form of uniting the brake shoe with the back plate;

Fig. 10 is a longitudinal sectional view of a modified form of brake shoe and back plate;

Fig. 11 is a fragmentary view of the blank from which the black plate illustrated in Fig. 10 is obtained;

Fig. 12 is a sectional view on line *d—d* of Fig. 10;

Fig. 13 is a longitudinal sectional view of the brake shoe of Fig. 6 illustrating flanges;

Fig. 14 is a sectional view on line *e—e* of Fig. 13, and

Fig. 15 is a view similar to Fig. 6 of a modified form.

Referring more particularly to Figs. 1, 2, 3, 4, 5 and 6, I show a brake head 1 which is adapted to hold the brake shoe 2. The brake shoe is provided with a back 3 shown more clearly in Fig. 6, which back has a body portion 4 suitably rounded as illustrated and provided with holes 5, 5 and 6, $6^a$ to permit the metal of the brake shoe to flow therethrough and firmly unite the said brake shoe and back plate. The key lug 7 is formed from the metal which is drawn out of the body portion 4, being drawn longitudinally away from the opening $6^a$. Suitable holes 8 are provided of course in this key lug to permit the key 9 to pass therethrough and hold the brake shoe in place in the head. It will be seen that the material which is drawn from the body portion to form the key lug is drawn away without distorting the body portion which is merely bent into its arcuate form, thus maintaining the original strength of this back plate and providing a structure which is very simple in its nature.

In Fig. 15, I show a structure somewhat similar to that of Fig. 6 except that the key lug 7 is formed of two parts 7ª, 7ª drawn similarly from the body portion without distorting it, a strengthening rib 9ª however being left in position to further increase the resisting qualities of the back plate, and tie the metal of the shoe to the back.

In Figs. 1, 2, 3, 4 and 5, I show the back plate of Fig. 6 as completely embedded in the metal of the brake shoe. In Fig. 7, I show the back plate as only partially embedded in the material of the brake shoe; whereas in Fig. 8, I show the back plate as being flush with the outer face of the material of the brake shoe, but embedded in the brake head seats of the shoe.

In Fig. 9, I show the same form of back so arranged however that the key lug portion 7 is not embedded in the lug portion 10 of the brake shoe but forms the outer surface thereof.

In Fig. 11, I show a fragmentary form of blank or back having the body portion 4ª from which the tongue 11 is drawn transversely out of the material of the body to form the key lug as shown more clearly in Figs. 10 and 12. It will be noted that the finger is provided with a projecting portion 12 to hold it firmly in position as shown more clearly in Fig. 12. In this structure again, while the key lug is drawn from the material of the body portion, the said body portion is not distorted but is merely rounded to conform to the shape of the brake shoe.

In Figs. 13 and 14, I show the general style of back plate as shown in Fig. 6, but provided with downwardly extending flanges 13, 13, the back plate itself resting against the back of the brake shoe proper as shown more clearly in Fig. 14, the flanges themselves holding the back plate within the metal of the brake shoe. In the normal wear of the brake shoe it is designed that the wear should generally not take place any farther than the dotted line 14, but as will be readily apparent in an emergency a slight additional wear may take place which would at the same time wear the flanges 13 slightly, which additional wear however would not destroy the efficacy of the brake shoe. I am thus enabled to increase the wearing qualities of the shoe, while still remaining within the specifications ordinarily accepted as requisite for devices of this kind.

Having thus described several forms which my invention may take, what I claim as new and desire to secure by Letters Patent is:

1. A back for a brake shoe consisting of a body strip provided with a centrally located, slotted key lug formed of a tongue drawn longitudinally from the said body strip without bending the remaining portions of said body strip.

2. A back for a brake shoe consisting of a body strip provided with a centrally located, slotted key lug formed of a tongue drawn from the said body strip without bending the remaining portions of said body strip.

3. A back for a brake shoe consisting of a body strip provided with a centrally located, slotted key lug formed of a tongue drawn substantially from the said body strip without bending the remaining portions of said body strip.

4. A back for a brake shoe consisting of a body strip provided with a centrally located, slotted key lug formed of a tongue drawn longitudinally from the said body strip without bending the remaining portions of said body strip, said body strip having angularly extending flanges adapted to be embedded in the metal of the shoe.

5. A back for a brake shoe consisting of a body strip provided with a centrally located, slotted key lug formed of a tongue drawn longitudinally from the said body strip without bending the remaining portions of said body strip, and said body strip being adapted to be partially embedded in the metal of the shoe.

6. A back for a brake shoe consisting of a body strip provided with a centrally located, slotted key lug formed of a tongue drawn longitudinally from the said body strip without bending the remaining portions of said body strip, said body strip having angularly extending flanges adapted to be embedded in the metal of the shoe, and said body strip being adapted to be partially embedded in the metal of the shoe.

7. A back for a brake shoe consisting of a body strip provided with a centrally located, slotted key lug formed of a tongue drawn longitudinally from the said body strip without bending the remaining portions of said body strip, and said body strip being adapted to be partially embedded in the metal of the shoe, the said lug being unembedded in the metal of said shoe.

8. A back for a brake shoe consisting of a body strip provided with a centrally located, slotted key lug formed of a tongue drawn longitudinally from the said body strip without bending the remaining portions of said body strip, said body strip having angularly extending flanges adapted to be embedded in the metal of the shoe, and said body strip being adapted to be partially embedded in the metal of the shoe, the said lug being unembedded in the metal of said shoe.

9. A back for a brake shoe consisting of a body strip provided with a centrally located, slotted key lug formed of a tongue drawn longitudinally from the said body strip without bending the remaining portions of said body strip, and said body strip being adapted to be embedded in the metal of the shoe.

10. A back for a brake shoe consisting of a body strip provided with a centrally located, slotted key lug formed of a tongue drawn longitudinally from said body strip without bending the remaining portions of said body strip, said body strip having angularly extending flanges adapted to be embedded in the metal of the shoe, and said body strip being adapted to be embedded in the metal of the shoe.

11. A back for a brake shoe consisting of a body strip provided with a centrally located, slotted key lug formed of a tongue drawn longitudinally from the said body strip without bending the remaining portions of said body strip, thereby forming a hole in said body strip through which the metal of the shoe may flow to unite said back and shoe together.

12. A back for a brake shoe consisting of a body strip provided with a centrally slotted key lug formed of an untwisted tongue drawn longitudinally from the said body strip without bending the remaining portions of said body strip.

13. A back for a brake shoe consisting of a body strip provided with a centrally located slotted key lug formed by a tongue consisting of a continuous strip of metal drawn longitudinally from the said body strip without bending the remaining portions of said body strip.

14. A back for a brake shoe consisting of a body strip provided with a key lug formed by a tongue of a continuous strip of metal drawn from either end of said strip toward the center of said body strip without bending the remaining portions of said body strip.

15. A back for a brake shoe consisting of a body strip provided with a central key lug formed by a tongue of a continuous strip of metal drawn longitudinally from said body strip without bending the remaining portions of said body strip.

16. A back for a brake shoe consisting of a body strip provided with a central key lug formed by a tongue of a continuous strip of metal drawn longitudinally from said body strip without bending the remaining portions of said body strip, said tongue being drawn from said strip intermediate its side edges.

17. A back for a brake shoe consisting of a body strip provided with a holding lug consisting of a continuous strip of metal formed of a tongue drawn from said body strip thereby forming means for fastening the said body strip to the shoe body underneath the said lug.

18. A back for a brake shoe consisting of a body strip provided with a key lug drawn from the material of said body strip, the space occupied by the material forming said key lug forming means whereby the said back may be fastened to the brake shoe at one end thereof.

19. A back for a brake shoe consisting of an unbent body strip of arcuate form provided with a key lug, the space occupied by said lug providing a hole for fastening the said back to the shoe body underneath the said lug.

20. A back for a brake shoe consisting of an unbent body strip of arcuate form provided with a central continuous key lug, the space originally occupied by said lug providing means for fastening the said body strip to the brake shoe body.

21. A back for a brake shoe consisting of a body strip provided with a key lug drawn from the metal of said body strip, the space occupied by the material forming said key lug forming means whereby the said back may be fastened to the brake shoe at one end thereof, and means in the opposite extremity of said back whereby the said back may be fastened at its opposite extremity in said brake shoe.

22. A back for a brake shoe consisting of a body strip provided with a key lug drawn from the metal of said body strip, the space occupied by the material forming said key lug forming means whereby the said back may be fastened to the brake shoe at one end thereof and underneath the said key lug, and means in the opposite extremity of said back whereby the said back may be fastened at its opposite extremity in said brake shoe.

23. A back for a brake shoe consisting of a body strip provided with a key lug formed of a tongue drawn from said body strip, said tongue being cut substantially one-half the length of said body strip from either end beyond the center of said strip.

24. A back for a brake shoe consisting of a body strip provided with a centrally located, slotted key lug formed of a tongue drawn from said body strip having fastening means in said tongue.

25. A back for a brake shoe consisting of a body strip provided with a key lug formed of a tongue drawn from said body strip, said lug being unembedded in the metal of the shoe.

26. A back for a brake shoe having a tongue stamped therefrom to form a central holding lug for said back.

27. A brake shoe consisting of a shoe body and a shoe back provided with a central holding lug pressed from a portion of said shoe back and drawn lengthwise therefrom.

28. A back for a brake shoe consisting of a metal strip having a portion drawn endwise and bent to form a key lug and leaving an opening between said portion and the adjacent end of the shoe.

29. A back for a brake shoe having a portion thereof extending from a line at one side of its center to a line adjacent its end on the other side of its center drawn endwise toward its center to form a key lug.

In witness whereof, I hereunto subscribe my name this 16th day of February, A. D., 1916.

CHARLES W. ARMBRUST.

Witnesses:
HAZEL A. JONES,
MAX W. ZABEL.

Copies of this patent may be obtained for five cents each, by addressing the "Commissioner of Patents, Washington, D. C."